United States Patent
Martin et al.

(10) Patent No.: US 11,608,179 B2
(45) Date of Patent: Mar. 21, 2023

(54) SEAT EXTENSION WITH MODULAR LENGTH, UNIT COMPRISING A SEAT EXTENSION AND PASSENGER CABIN

(71) Applicant: STELIA AEROSPACE, Rochefort (FR)

(72) Inventors: Gabriel Martin, Echillais (FR); Laurent Texeraud, Clavette (FR); Sylvain Gonfalone, Rochefort (FR)

(73) Assignee: AIRBUS ATLANTIC, Rochefort (FR)

( * ) Notice: Subject to any disclaimer, the term of this patent is extended or adjusted under 35 U.S.C. 154(b) by 395 days.

(21) Appl. No.: 16/268,998

(22) Filed: Feb. 6, 2019

(65) Prior Publication Data
US 2019/0241269 A1 Aug. 8, 2019

(51) Int. Cl.
*B64D 11/06* (2006.01)

(52) U.S. Cl.
CPC ...... *B64D 11/0641* (2014.12); *B64D 11/0601* (2014.12); *B64D 11/0604* (2014.12); *B64D 11/0605* (2014.12); *B64D 11/0636* (2014.12); *B64D 11/0646* (2014.12)

(58) Field of Classification Search
CPC . B64D 11/06; B64D 11/0641; B64D 11/0643; B64D 11/0646; B64D 11/0601; B64D 11/0602; B64D 11/0604; B64D 11/0606
See application file for complete search history.

(56) References Cited

U.S. PATENT DOCUMENTS

| 2,947,349 | A | * | 8/1960 | Kryter | B64D 11/00 297/174 R |
|---|---|---|---|---|---|
| 5,954,401 | A | * | 9/1999 | Koch | B64D 11/0638 297/354.13 |
| 8,485,470 | B2 | * | 7/2013 | Hankinson | B64D 11/06 244/118.6 |
| 8,979,189 | B2 | * | 3/2015 | Henshaw | B64D 11/06 297/147 |
| 9,315,270 | B2 | * | 4/2016 | Dryburgh | B64D 11/0601 |
| 9,382,007 | B2 | * | 7/2016 | Ersan | B64D 11/0641 |
| 9,446,848 | B2 | * | 9/2016 | Jerome | B64D 11/0641 |
| 9,533,765 | B2 | * | 1/2017 | Vergnaud | B64D 11/0604 |

(Continued)

FOREIGN PATENT DOCUMENTS

WO 2011067286 6/2011

*Primary Examiner* — Richard Green
*Assistant Examiner* — Michael A. Fabula
(74) *Attorney, Agent, or Firm* — Perman & Green, LLP

(57) ABSTRACT

A cabin of a vehicle for transporting passengers includes a plurality of units, each unit including a seat and a modular seat extension arranged staggered in the units. Each extension includes a shell having a front bottom and a rear opening determined by a hollow volume open towards the rear and a footrest area inside the hollow volume suitable for receiving the feet of a passenger. The shell of each extension includes an invariant portion and a modular portion located in front of the invariant portion. The modular portion making it possible during the fastening thereof to the invariant portion to obtain an extension with a length that can be modified between the opening and the bottom of the shell and, a width of passage towards the aisle between the seats and the extensions of the units is maintained constant during the use of the extensions by the passengers.

8 Claims, 5 Drawing Sheets

(56) References Cited

U.S. PATENT DOCUMENTS

| | | | |
|---|---|---|---|
| 10,246,192 B1* | 4/2019 | Prasad | A47B 81/064 |
| 10,569,688 B2* | 2/2020 | Cansfield | B64D 11/0601 |
| 10,647,221 B2* | 5/2020 | Trillaud | B60N 3/001 |
| 10,752,364 B2* | 8/2020 | Sieben | B64D 11/0643 |
| D901,199 S * | 11/2020 | Katakura | D6/356 |
| 2005/0067870 A1* | 3/2005 | Rezag | B64D 11/064 297/354.13 |
| 2007/0040434 A1* | 2/2007 | Plant | B64D 11/0643 297/354.13 |
| 2007/0246981 A1* | 10/2007 | Plant | B64D 11/064 297/248 |
| 2012/0298798 A1 | 11/2012 | Henshaw et al. | |
| 2014/0283296 A1* | 9/2014 | Jerome | B64D 11/0646 5/12.1 |
| 2014/0361585 A1* | 12/2014 | Henshaw | B64D 11/0606 297/174 R |
| 2015/0136904 A1* | 5/2015 | Savard | B60N 2/24 244/118.6 |
| 2017/0088267 A1* | 3/2017 | Dowty | B64D 11/06 |
| 2017/0240283 A1* | 8/2017 | Dowty | B64D 11/0606 |
| 2017/0259921 A1* | 9/2017 | Valdes De La Garza | B64D 11/0641 |
| 2018/0029712 A1* | 2/2018 | Sieben | B64D 11/064 |
| 2019/0152606 A1* | 5/2019 | De La Garza | B64D 11/0641 |
| 2019/0193616 A1* | 6/2019 | Cansfield | B60N 3/02 |
| 2019/0233116 A1* | 8/2019 | Braga | B64D 11/064 |

\* cited by examiner

SEAT EXTENSION WITH MODULAR LENGTH, UNIT COMPRISING A SEAT EXTENSION AND PASSENGER CABIN

CROSS REFERENCE TO RELATED APPLICATIONS

This application claims priority to and the benefit of French Application No. 1851004, filed 7 Feb. 2018, the disclosure of which is incorporated herein by reference in its entirety.

BACKGROUND

1. Field

This disclosed embodiment relates to the field of layouts of cabins for transporting passengers.

More particularly, the disclosed embodiment relates to a seat extension with a modular length comprising a footrest area. The disclosed embodiment also relates to a passenger seat unit for a vehicle that can be transformed into a sleeper berth comprising the seat extension of the disclosed embodiment, as well as a passenger cabin.

2. Brief Description of Related Developments

In the field of transporting persons, it is known to propose to passengers travelling long distances seats that can be converted into sleeper berths that allow a passenger to have a reclining position. The seats in sleeper berth position allow the passenger to rest and/or fall asleep in a comfortable position. This position of the seat is obtained typically by a combined movement of the seat surface, of the seat back and of a footrest that positions these various portions of the seat horizontally in order to form the sleeper berth.

Several solutions are known for adopting this horizontal position, also called the bed position, for example the change in configuration of a single seat integrating the seat surface, the seat back and the footrest. Such seats however have the disadvantage of requiring a complex transformation mechanism in order to switch from a sitting configuration to a bed configuration.

A simpler solution from a mechanical standpoint consists in combining a seat comprising a seat back that can be inclined with an independent footrest positioned in front of it. It is known for example to use the rear portion of a seat of the row located in front in order to integrate a footrest and as such optimise the use of the space in order to place a maximum number of armchairs that can be transformed into sleeper berths. Patent applications US 2012/0298798 A1 and WO 2011/067286 A2 give examples of configurations of cabin seats that can be transformed into beds of which the footrest is integrated into the shell of the seat in front.

Indeed, using seats that can be converted into sleeper berth is highly penalising in terms of space and these seats are often reserved for passengers in first class who pay a higher price for their travel. These passengers however have high requirements for their comfort during travel and in particular with regards to their seats. The integration of a footrest of another seat into the same structure as the one where they are resting is therefore not always appreciated, as the vibrations and the sounds due to the movement of the feet of the passenger occupying the seat behind are perceived by the passenger of the seat in front.

Another solution in order to adopt the bed position of a seat consists in using an ottoman in order to form an independent seat extension, which is used by the passenger in sitting or intermediate position for placing their feet, then in the bed position is an extension in addition to the seat surface and seat back placed horizontally. This solution is differentiated from the prior solution in that the footrest extension is not in direct contact with the rear portion of a seat of another passenger. For example, in aircraft cabins it is known to use a staggered configuration such as the one shown in FIG. 1 of which the ottomans are integrated into a shell and are placed in front of the corresponding armchair. In the staggered configuration, the ottoman is not placed behind the structure of a passenger seat of the preceding row but next to the latter.

On the other hand, the distances between each seat and/or ottoman must take account not only the criteria of passenger comfort and of the profitability of the space but also the safety, such as respecting the passage widths that result in minimum distances between seats allowing for the exiting of passengers according to the rules for evacuation. However, the need for a space for passage between two armchairs is not shared by all of the seats in a transport cabin in particular for the seats located along a wall. This results in that an unused space is often left in front of certain seats without corresponding to a requirement of an access passage to a circulation aisle or an exit. In addition, the optimum pitch between the seat and the footrest in order to arrange a maximum number of seats possible in the bed position in a cabin does not correspond, in certain cases, to the pitch required to respect the optimum dimensions of the passages to the corridors.

Although ideally the arrangement of the seats has to take account of the various needs for space of each seat, it is often preferred to implement standardised environments where all of the seats share the same structure and the same installation instructions. This results in that during the increase in the pitch between seats, the pitch between seats that are not concerned by the passages are jointly increased, thus resulting in free spaces that are not optimally used.

Today a solution used in order to not waste space is to increase the shell behind the seat when this is possible. That is to say, one place out of two, when there is no need to maintain a passage on the ottoman side. This solution comprises certain disadvantages, first of all modifying the environment behind the seat imposes a modification of the structure of the shell. This modification imposes a qualification of each version, which means an extra cost which is not negligible. In addition, this modification is complex in terms of management of production and usage and it is therefore not used to manage increases in pitch.

Then, extending the shell creates a space between the armchair and the shell that will have to be filled in. In the same way, increasing the bed function above the headrest forces passengers to reposition themselves once the armchair is in the horizontal position. The prior solution is therefore not often set up and the standard environments (designed with a minimum pitch) remain used, such as the one in FIG. 1.

SUMMARY

The aim of this disclosed embodiment is to propose a solution for arranging seats that can be transformed into sleeper berths in a passenger transport cabin that makes it possible to take advantage of the free space available between the seats that do not affect the passages to the circulation aisles, while still retaining a standardised structure and installation for all of the seats.

Another purpose of the disclosed embodiment is to constantly maintain the width of the passage towards the aisle for a given cabin arrangement, said passage width being at least equal to the minimum value required for safety and for the comfort of the passenger that can use said passage, while using to the maximum the space available between the seats.

To this effect, the disclosed embodiment proposes a cabin of a vehicle for transporting passengers comprising a plurality of units, each unit comprising a seat and a modular seat extension arranged staggered in said plurality of units, wherein each modular seat extension comprises a shell comprising a front bottom and a rear opening determined by a hollow volume open towards the rear and a footrest area inside said hollow volume suitable for receiving the feet of a passenger occupying the seat using said seat extension. Advantageously, the shell of each one of the seat extensions comprises an invariant portion and a modular portion located in front of said invariant portion, said modular portion making it possible during the fastening thereof to the invariant portion to obtain a seat extension with a length that can be modified between the opening and the bottom of the shell, and in that a passage width L towards the aisle between the seats and the seat extensions of said plurality of units is maintained constant during the use of the seat extensions by the passengers intended to travel in said cabin.

The length of said seat extension can be modified during the arranging of the cabin in order to obtain a minimum length, for example substantially equal to a length of the invariant portion, a maximum length and where applicable at least one intermediate length between the minimum and maximum length.

The seat extension of the disclosed embodiment can also comprise all or some of the following characteristics considered separately or in any technically permissible combination.

The modular portion is mobile between a first position wherein it is retracted at least partially in the invariant portion of the shell in such a way that the length of the seat extension is minimal and, at least one second position wherein the modular portion is deployed outside towards the front of the seat extension and the length of the seat extension is increased with respect to the minimum length.

The modular portion is chosen from a set of shell elements with different lengths that can be indifferently be fastened to the invariant portion. The modular portion can thus be long or short and be adapted to the invariant portion in an interchangeable manner without necessarily using a sliding with cylindrical portions.

The modular portion is slidably mounted with the invariant portion of the shell wherein it is nested entirely or partially and in such a way that a portion of the modular portion can be fastened either in the first retracted position or in the second deployed position, where applicable in an intermediate position between the first position and the second position.

The modular portion of the shell comprises a hollow volume adjacent to the footrest area, said hollow volume being arranged in order to increase a length of the footrest area and/or, to form and/or integrate spaces for storing objects.

The modular portion of the shell comprises an outer face in continuity with an outer face of the invariant portion, an upper portion of said faces forming together a substantially flat and substantially horizontal surface for placing objects, or for integrating spaces for storing objects.

The disclosed embodiment also relates to a cabin wherein each one of the units comprising a seat and a seat extension can be transformed into a bed by a combined movement of a seat surface and of a seat back forming a substantially horizontal surface and in continuity with the footrest area of the seat extension which is placed in front of said seat.

The disclosed embodiment also relates to a seat unit and a modular seat extension arranged laterally to said seat in a common structure.

The disclosed embodiment also relates to a method for arranging passenger transport cabins, in particular of an aircraft, comprising a plurality of seat-seat extension units according to the disclosed embodiment. The seat extensions can be arranged identically for all of the seats or differently according to which a seat is located at the edge of an aisle or not, still for maintaining a sufficient passage width.

BRIEF DESCRIPTION OF THE FIGURES

The disclosed embodiment shall be better understood when reading the following description and when examining the accompanying figures. The latter are shown only for the purposes of information and do not limit the disclosed embodiment in any way.

DETAILED DESCRIPTION

Figure 1:
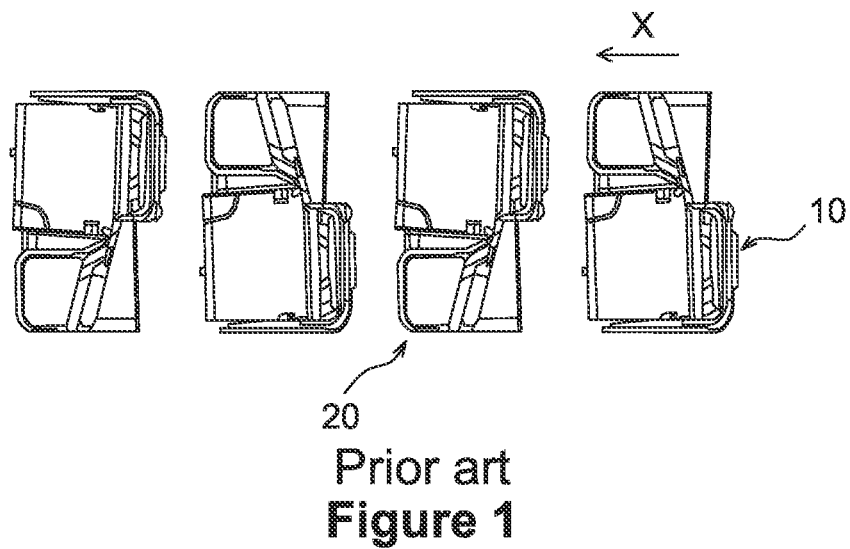
FIG. 1: Already mentioned as a top view, according to prior art, a staggered arrangement of a row of seats that can be transformed into sleeper berths comprising an ottoman as a footrest extension.

For the purposes of the description, consideration shall be given to a forward direction, materialised by an arrow oriented along a longitudinal axis X of the unit in the drawings. The choice of a positive direction towards the front of the axis longitudinal X is here arbitrary and shall therefore not be considered as a restriction of the disclosed embodiment. However, unless mentioned otherwise, the front and the rear of a seat must be interpreted in relation to the forward direction towards which an occupant sitting on the seat is looking.

FIG. 1 shows the staggered arrangement of the seats that can be transformed into sleeper berths in a passenger transport cabin of which each seat comprises an extension for the placing of the feet independent of the seat surface, placed in front of said seat, in the form of an ottoman fastened to the floor and surrounded by a shell open towards the rear. In this type of arrangement each row of seats comprises a seat surface and a seat back of a seat next to an ottoman intended for the seat of the row behind. As the ottoman is surrounded in the shell, the feet of the passenger behind do not disturb the passenger of which the armchair is arranged next to the ottoman. In each row the arrangement of the armchair and of the ottoman alternates between left and right according to a staggered arrangement in such a way as to optimise the space occupied.

Figure 2:
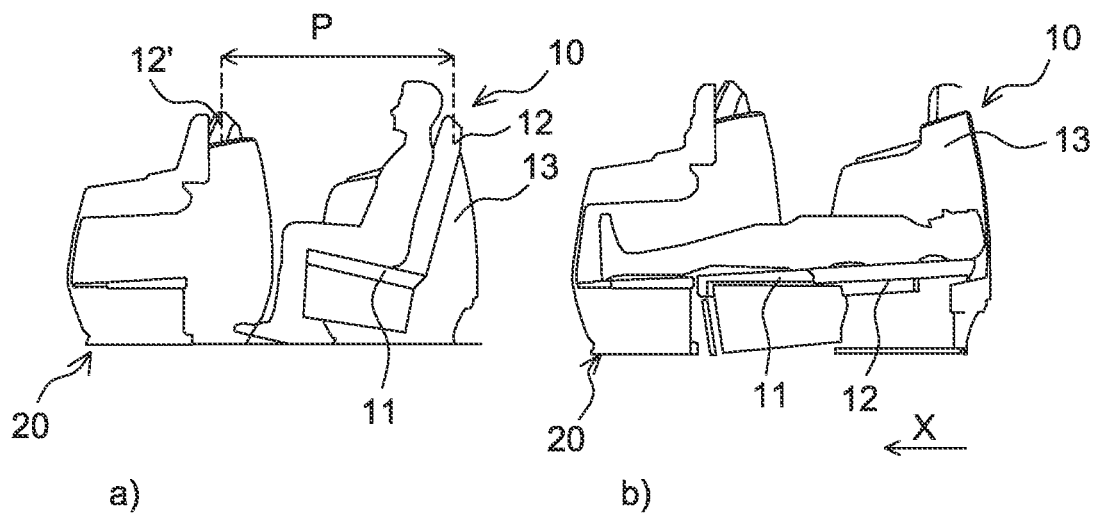
FIG. 2: As a lateral view, according to prior art, a seat that can be transformed into a sleeper berth a) in the sitting position, b) in the bed position.

FIG. 2 shows a representation from prior art wherein the seat 10 that can be transformed into a sleeper berth is surrounded by an environment 13, and an ottoman 20 is used as a footrest extension of the seat 10. The seat 10 comprises, in relation to the floor, a seat surface 11 in a substantially horizontal position and a seat back 12 in a substantially vertical position (detail a). The combined movement of the seat back and of the seat surface makes it possible to position these two portions in the horizontal position at a height that is substantially equal to that of the footrest extension arranged in the continuity of the longitudinal axis of the seat (detail b). A horizontal surface is thus obtained comprising the combined surface of the seat back, of the seat surface and of the footrest extension allowing the passenger to recline comfortably during their travel.

Figure 3:
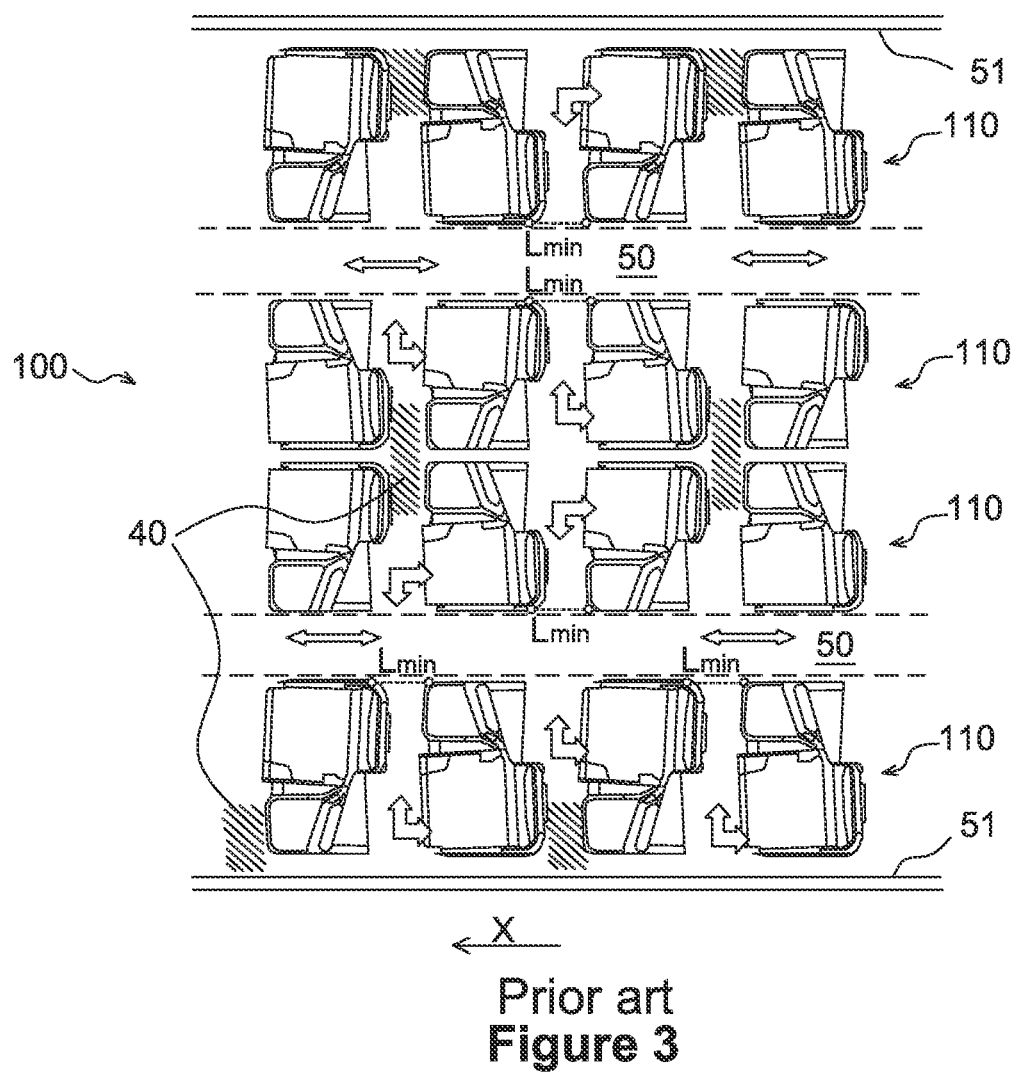
FIG. 3: As a top view, according to prior art, a staggered arrangement of seats that can be transformed into sleeper berths in a passenger transport cabin that materialises the spaces that are free and not used between seats.

The arrangement of a cabin 100 comprising seats that can be transformed into sleeper berths gives rise to particular problems as to the optimisation of the space and the accessibility to the corridors of the passengers occupying an adjacent seat (FIG. 3). The distance between two seats along the longitudinal direction is therefore on the one hand chosen to allow for the configuration as a bed of the seat, and on the other hand in order to maintain a passage to the corridors or circulation aisles 50. A pitch P between two seats is therefore constrained by the minimum distance required to enable the seat to take the position of a sleeper berth and simultaneously in order to maintain at least the minimum width Lmin of the passage required between two rows of seats. In the example of FIG. 2, the pitch is measured along the longitudinal direction between reference points of the seats, for example from a point of the seat back 12 of a seat in vertical position to the same longitudinal point of the seat back 12' of the seat of the following row in vertical position.

Figure 4:
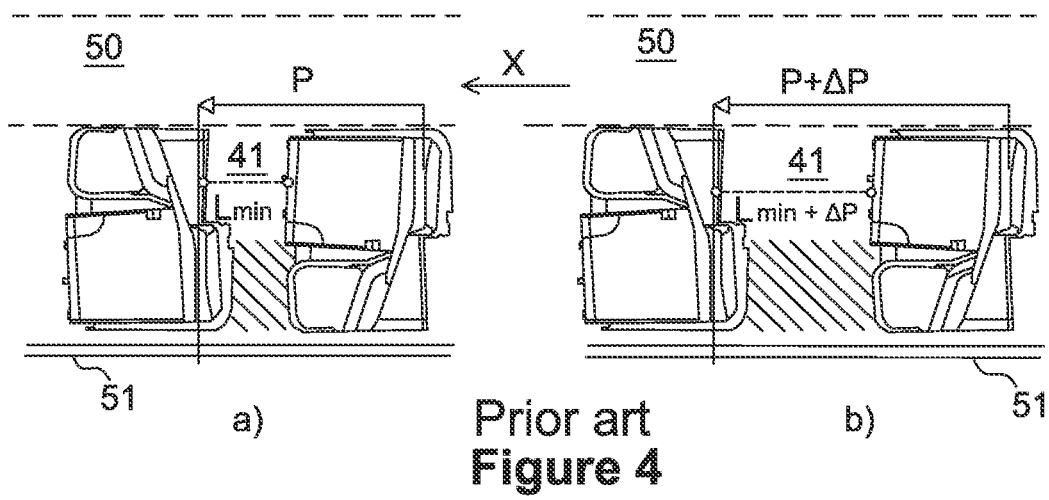
FIG. 4: As a top view, according to prior art, two successive seats of the same row, a) with an optimum seat pitch, b) with an increased seat pitch.

FIGS. 3 and 4 show free spaces 40 (materialises by the hatched zones in the figures) which between two rows of seats are not used to access a circulation aisle 50 such as those next to a wall 51, as well as those arranged in the centre of the cabin.

FIG. 4 in particular shows that the extending of the pitch P by a value ΔP (part b of the figure) not only increases the unused surface, the hatched portion, but also enlarges the passage of ΔP while the initial width is sufficient from a regulatory standpoint.

Figure 5:
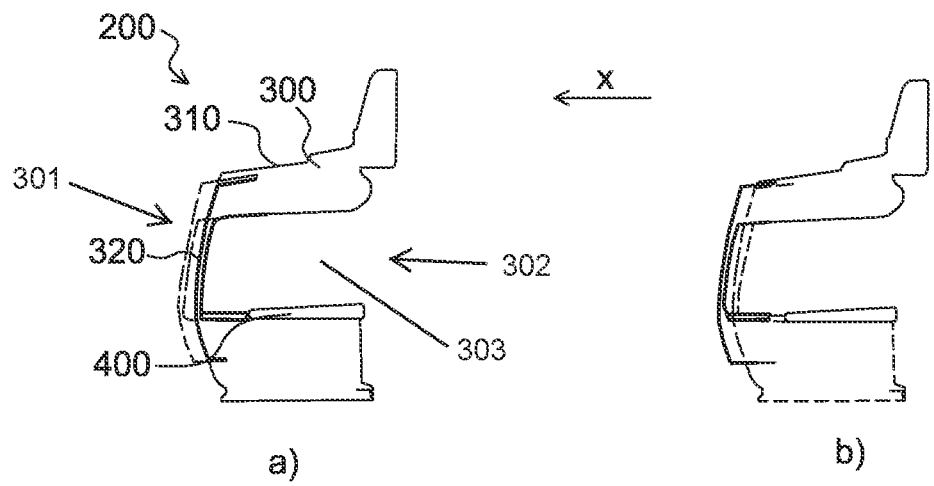
FIG. 5: Along a simplified axial longitudinal section, a modular seat extension according to the disclosed embodiment.

FIG. 5 shows a modular seat extension 200 according to the disclosed embodiment in two positions, a first position wherein the length of the seat extension is minimal (detail a) and in a second position (detail b) wherein the length of the seat extension is increased with respect to the first position. This modification in length makes it possible to use free spaces 40 which are not used as passages to a circulation aisle 50 or which are not required to respect a minimum width of the passage, while still allowing for the use of a common structure for all of the rows of seats when the seat pitch is modified.

The seat extension 200 according to the disclosed embodiment comprises a shell 300 comprising a front bottom 301 and a rear opening 302 determined by a hollow volume 303 open towards the rear as well as a footrest area 400. The footrest area 400 is placed at a height making it possible to form a flat substantially horizontal surface and in continuity of the surface of a seat 10 in the sleeper berth position. The shell 300 of the seat extension 200 supports the footrest area 400 and determines its height in relation to the floor. The shell 300 also surrounds, at least partially, the footrest area 400 in such a way as physically separating the environment surrounding the feet and/or legs of the passenger using the seat extension 200 of the environment of the passenger seat arranged next to said seat extension. The shell of course has an opening of the footrest area suitable for receiving the feet and, at least partially the legs of a passenger.

A structure of the shell 300 of the seat extension comprises at least two parties: a rear invariant portion 310, i.e. a structure of which the dimensions are fixed and identical for all the seat extensions in a cabin arrangement, and a front modular portion 320 of which a position for fastening in relation to the invariant portion allows to increase the length of the seat extension of the disclosed embodiment according to the embodiment shown.

In this application, it must be understood by the term "modular portion" that the modular portion 320 of the seat extension makes it possible, during the installation of the arrangement of the cabin, to choose within an authorised domain, the length of said seat extension. As shall be understood in the description, the choice of the length of the seat extension can result in the implementation of a modular portion of an adapted length, chosen from a set of modular portions of different lengths, and/or through a mounting of the modular portion more of less nested in the invariant portion during the arrangement of the cabin. The length of the seat extension cannot be modulated by the passenger during the use of the seat, with this length remaining constant when a seat is in the raised or flat position.

For example, the modular portion 320 comprises a first position (FIG. 5-a) and at least one second position (FIG. 5-b), shifted between them according to a longitudinal direction in relation to the rear invariant portion 310. In the first position (FIG. 5-a), the modular portion 320 is nested or retracted into the invariant portion 310 of the shell in such a way that the footrest area has a shorter length of the seat extension 200.

In the at least one second position (FIG. 5-b), the modular portion 320 is in a deployed position in relation to the invariant portion 310 and the length of the seat extension is increased in relation to its length in the first nested position of said modular portion. In the FIGS. 5-a) and 5-b) the modular portion shown as a broken line corresponds to the other possible position, respectively deployed and retracted.

The modular portion 320 can be fastened to the invariant portion 310 of the shell 300 directly in the first nested position and/or in the at least one second deployed position, where applicable in several second intermediate positions between the first nested position and a second position of maximum extension. In this embodiment of the disclosed embodiment, the modular portion 320 is telescopic in relation to the invariant portion 310 of the shell 300 and allows for a flexible change in the configuration of the seat extension 200 via a sliding associated with means for blocking in a desired position.

In another embodiment the modular portion is formed of elements of different lengths that can be interchanged and indifferently fastened to the invariant portion 310.

Figure 6:
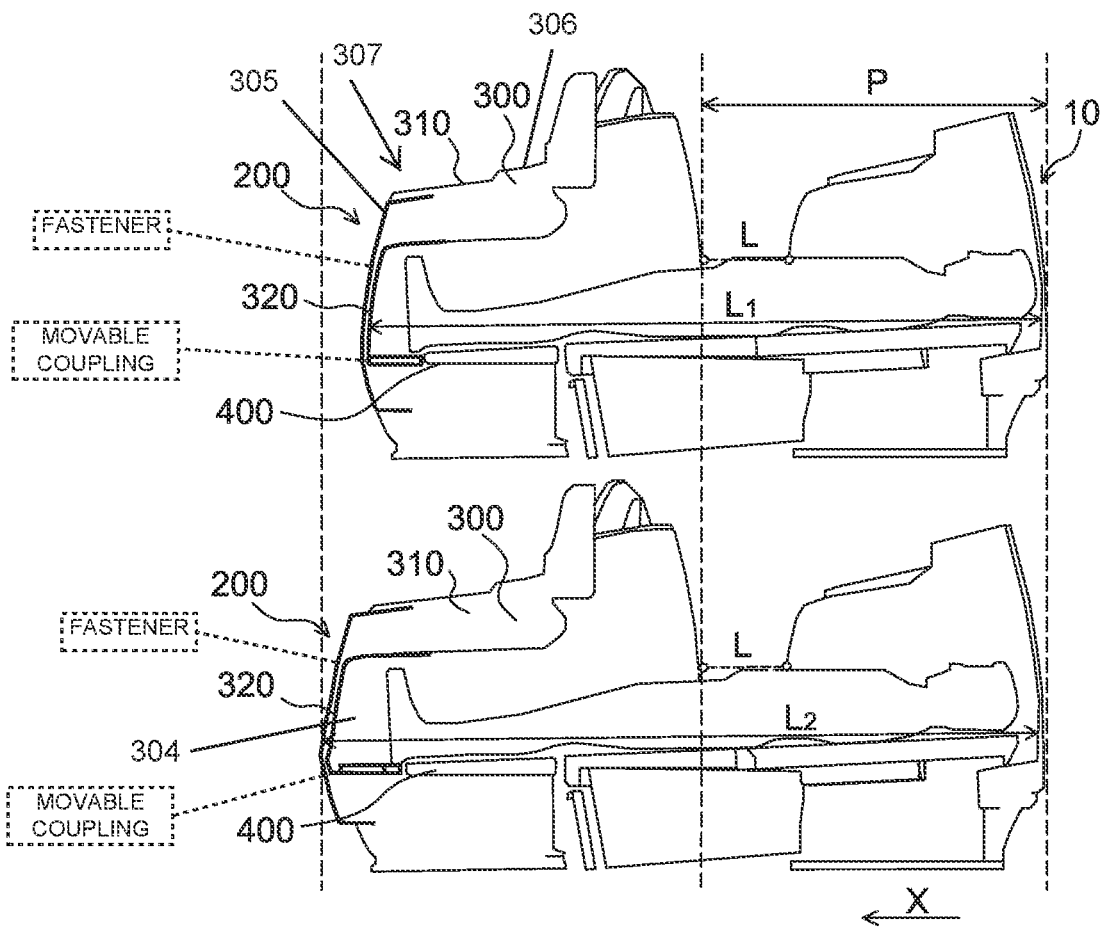
FIG. 6: Along a simplified axial longitudinal section, a seat that can be transformed into a sleeper berth comprising a footrest extension according to the disclosed embodiment. At the top) according to a minimum bed length, at the bottom) according to an increased bed length.

FIG. 6 shows an embodiment of the disclosed embodiment wherein a modular seat extension 200 is used as footrest extension in order to form the bed configuration of a seat of a cabin passenger. In order to increase the length L1 that can be used in the bed position of said seat 10 combined with the seat extension, the modular portion 320 of the seat extension has a hollow area 304 in its portion adjacent to the footrest area 400 that makes it possible in a deployed position to extend the area of the latter. In this embodiment the pitch between seats remains constant and the modular portion makes it possible to obtain a bed length L2 that is freely increased for a seat located against a wall as long as there is no interference produced with the structure of the seat located in front.

Figure 7:
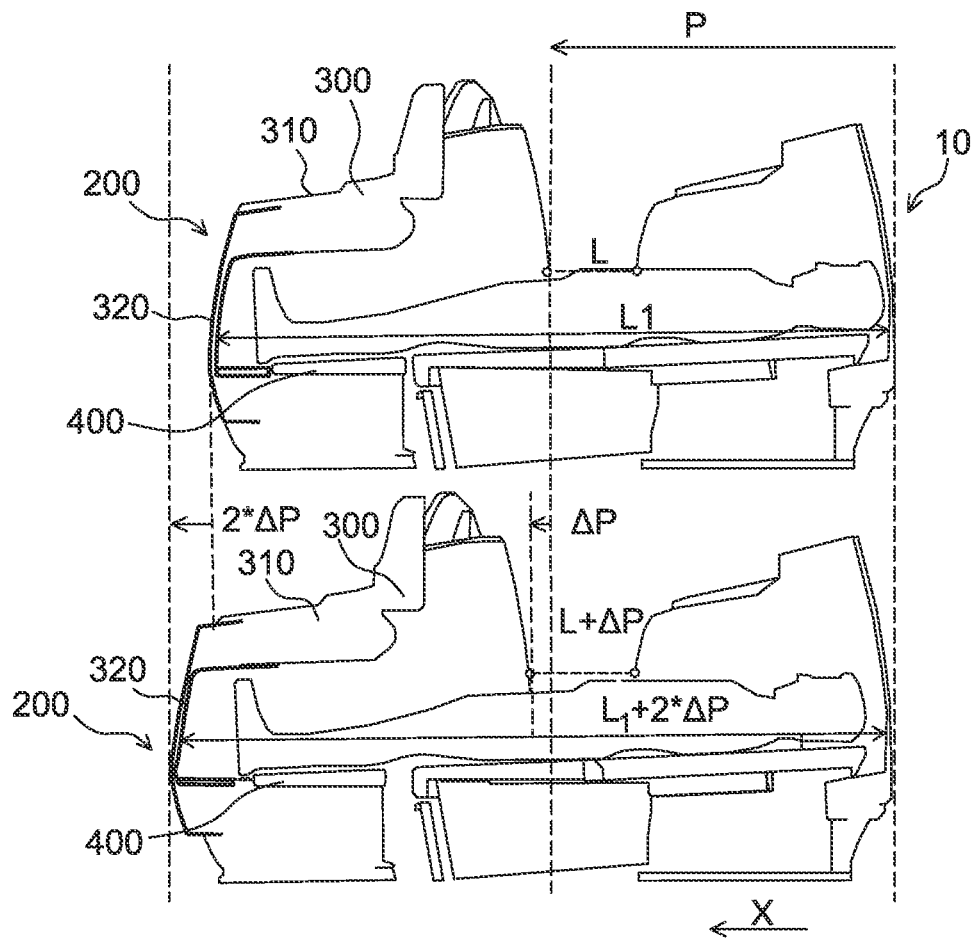
FIG. 7: Along a simplified axial longitudinal section, a seat that can be transformed into a sleeper berth comprising a footrest extension according to the disclosed embodiment. At the top) according to a bed length and a minimum pitch and, at the bottom) according to an increased bed length and pitch.

It is also possible to use the seat extension 200 during pitch increases between seats in order to optimally use this increase in distance between the seats. For example, in the embodiment of FIG. 7, the pitch between seats is increased by a value of ΔP, for example in order to increase the general comfort of the seats. This increase in the pitch makes it possible to extend by as much, with the extension being combined with the extending of the pitch. For example if the length of the seat extension is also modified by ΔP, the total length of the bed surface obtained will be L1+2*ΔP, a gain is thus made of double the distance used to increase the pitch of the seats, without detriment to the width of the passage between the seats.

The outer surface 305 of the modular portion is more preferably profiled to form a continuous surface with the outer surface 306 of the invariant portion of the shell (FIGS. 5 and 6) in such a way as to extend the surface of the upper face 307 of the shell in this zone. In another embodiment, the modular portion can be profiled to create and/or integrate new storage spaces, whether on the adjacent side of the footrest area 400 or on the outer side opposite said footrest area, with the new storage areas able in the latter case to be taken advantage of by the passenger occupying the seat in front of which the seat extension is arranged in the same row as the latter. The greater surface of the modular portion 320 can also be profiled in such a way as to form a flat surface able to support objects, this surface being available for the passenger of which the seat is arranged next to the seat extension.

The seat extension 200 can be placed in front of a seat in order to form a structure independently, or integrated laterally to a structure of a seat, said extension then being intended for another seat located behind. According to the last option, it is possible to design a unit comprising a seat 10 and a seat extension 200 arranged laterally to said seat 10 in a structure that is common to said seat and said seat extension.

Figure 8:
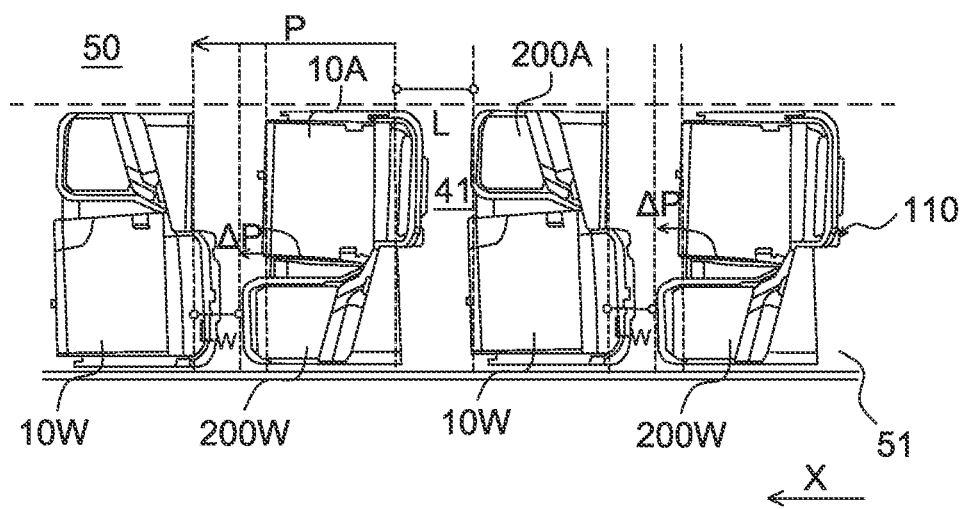
FIG. 8: As a top view, an arrangement of a passenger transport cabin comprising a plurality of seats comprising the seat extension according to the disclosed embodiment, wherein the length of the seat extensions is different.

FIG. 8 shows an example of arranging a cabin of a vehicle for transporting passengers comprising a plurality of seats 10 that can be transformed into sleeper berths with each one comprising a modular seat extension 200 according to the disclosed embodiment. In said arrangement the plurality of seat-seat extension units is arranged in rows 110 parallel to circulation aisles 50 of the cabin. The seats in the same row 110 are arranged according to a pitch P and staggered in such a way that a seat, referred to as a rear seat, is laterally offset with respect to a seat, referred to as a front seat, preceding said rear seat in said row, and on the same side with respect to the front seat as a seat extension adjacent to said front seat.

A space located between a seat back of a front seat 10A, adjoining a circulation aisle 50, and a front face of a seat extension 200A, adjoining said circulation aisle 50, adjacent to a rear seat 10W, said rear seat being separated from said circulation aisle by said seat extension 200A, forms a passage 41 of length L through which an occupant of rear seat 10W can access said rear seat from the aisle 50.

The arrangement in FIG. 8 is in part similar to the staggered arrangement shown in FIG. 1 according to prior art, however using the seat extension 200 according to the disclosed embodiment makes it possible to modulate this arrangement according to the seat in question. Thus, the modular portion 320 of the seat extension 200W opposite an aisle and adjacent to the rear seat 10A adjoining an aisle can be fastened to the invariant portion 310 of said seat extension according to the pitch P of the seats in order to determine a length L of the passage 41 greater than or equal to a predefined minimum width Lmin.

In the arrangement of FIG. 8 the modular portion 320 of a seat extension 200W adjacent to a rear seat 10A adjoining an aisle 50, said seat extension 200W being on a side of said seat opposite said aisle, can be fixed to the invariant portion 310 of said seat extension 200W in order to determine a space located between a seat back of the front seat 10W and a front face said seat extension 200W of a width LW, taken along a direction substantially parallel to the aisle 50, less than the width L of the passage 41, without a constraint on a passage width to be respected.

Figure 9:
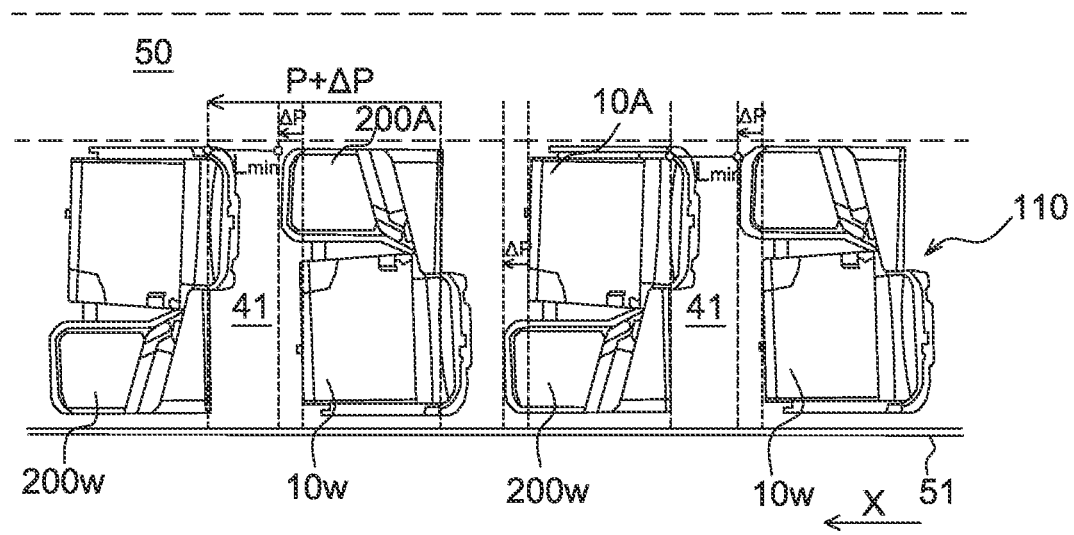
FIG. 9: As a top view, an arrangement of a passenger transport cabin comprising a plurality of seats comprising the seat extension according to the disclosed embodiment, wherein the seat extensions are extended by the same value.

FIG. 9 shows another possibility of a cabin arrangement wherein the modular portion 320 of the seat extension 200A adjoining an aisle and adjacent to the rear seat 10W is fastened to the invariant portion 310 of said set extension 200A in order to obtain a width of the passage 41 that is substantially equal to the predefined minimum width Lmin when the pitch P of installation of the seats so allows. This minimum width is in practice obtained with an extension ΔP of the length between the opening and the bottom of the shell 300, with respect to a possible minimum length between said opening and said bottom of the shell, in such a way that it is maximised the length of a bed, resulting from the combination of the seat converted into sleeping space with the seat extension, for a given seat pitch P by respecting the minimum width Lmin of the passage 41. This width ΔP also corresponds to an extending of the minimum value of the pitch P that would be possible to reach without the extending of the seat extension 200A.

It is also possible to carry out an alternative in the arrangement shown in FIG. 9, wherein the modular portion 320W of the seat extension 200W is fastened to the invariant portion 310 in order to obtain a width Lw that is substantially less than the minimum width Lmin. The length of the seat extension 200W can thus be increased as long as no interference is produced with the structure of the seat located in front 10W and, independently of the value of the extension chosen for the seat extensions 200A adjoining the aisles.

Using the seat extension according to the disclosed embodiment in order to arrange a cabin of passenger seats therefore has many advantages as to the use of the free spaces available between the seats in order to increase of the comfort of the passengers, for a gain over the length of the sleeping space, to which is added the creation of new spaces for storage or surfaces that can be used for example as a night table etc. During the use of the seats of the cabin, the width of the passage of a seat towards the aisle remains constant, whether the seat located behind is in the raised position or in the flat position. Therefore no mobile element is implemented in the seat extension for the purposes of using the seat. This results in a structure of the seat extension that is lighter, simpler and more reliable, and less expensive.

In addition, modifying the length of the modular seat extension makes it possible, without calling into question the structure of the existing seats, to limit the increases in pitch between seats required to increase a bed length. Indeed, it is possible when the pitch P of the seats is increased by a value ΔP to extend the seat extension by the same value ΔP which is combined with the increase in the pitch in order to procure a bed extended by 2*ΔP.

From an industrial standpoint, an advantage of the disclosed embodiment is to be able to standardise the elements that make it possible to fill in the space. The disclosed embodiment thus makes it possible to use the same structure common to all of the sets of a cabin arrangement type (staggered) and to have elements to be added onto this common structure, i.e. the invariant portion 310 of the shell 300 of the seat extension 200, either through adjusting or through interchangeability, in order to increase the length of said seat extensions optimally. It is thus possible to provide a personalised arrangement solution without generating significant costs for adaptation, conversion and qualification.

The seat extension according to the disclosed embodiment is therefore able to be adapted to the needs of different arrangements and passenger cabins with a single product family, as well as to personalise the seats and the arrangement of the seats using the modular portion of the seat extension.

What is claimed is:

1. A cabin of a vehicle for transporting passengers, wherein the cabin has a longitudinal direction and including within the cabin a plurality of units, each unit comprising a respective seat and seat extension couple, the seat extension couple is in front of the seat in the respective seat and seat extension couple, wherein the plurality of units are arranged in a staggered configuration such that a seat, in a seat row of the respective seat and seat extension couple is juxtaposed laterally with a different seat of a different seat and seat extension couple in a succeeding seat row, each respective seat and seat extension couple being configured to transform into a bed, by a combined movement of a seat surface and of a seat back, forming a substantially horizontal surface in continuity with a footrest area of the seat extension couple which is placed in front of the respective seat, wherein each one of the seat extension couples comprises:

a shell having a first end and a second end connected to and longitudinally spaced apart from one another, wherein the first end is an invariant structure with fixed and equal dimensions and includes a rear opening facing the respective seat of the respective seat and seat extension couple, the rear opening being determined by a hollow volume open towards the rear and facing a passenger on the respective seat, and a footrest area inside said hollow volume, wherein the footrest area is supported by the shell at a height so as to hold the feet in a raised position relative to the floor, and wherein the height is substantially equal to a seat height of the seat, wherein the second end includes a modular structure movably coupled to the invariant structure such that a position of the modular structure relative to the invariant structure is selectable between at least a first position and a second position, where the modular structure is profiled to form a continuous surface with the outer surface of the invariant structure and extending the upper face of the shell, wherein a length between the first end and the second end of the shell, defining the footrest area, is selectively variable via selection of the position of the modular structure relative to the invariant structure, where a fit-out arrangement of the cabin in a predetermined fit-out arrangement configuration of the cabin effects selection of the position of the modular structure, and wherein the modular structure is fixed to the invariant structure based on the selection of the position of the modular structure such that the length is fixed throughout use of the seat extension couple by passengers intended to travel in said cabin.

2. The cabin according to claim 1, wherein the length of each seat extension couple of the plurality of units is selectable between the first position being a minimum length, the second position being a maximum length and a third position being an intermediate length between the minimum and the maximum length.

3. The cabin according to claim 2, wherein the invariant structure has a length that is substantially equal to the minimum length of said seat extension.

4. The cabin according to claim 2, wherein the modular structure is movable between the first position wherein the modular structure is retracted entirely or partially into the invariant structure of the shell in such a way that the length of the seat extension couple is minimal and, at least the second position wherein the modular structure is deployed entirely or partially outside the invariant structure towards a front of the cabin and the length of the seat extension couple is increased with respect to the minimum length.

5. The cabin according to claim 2, wherein the modular structure of each seat extension couple of the plurality of units is slidably mounted with the invariant structure of the shell wherein the modular structure is nested entirely or partially and is fastened between the first position, which is a retracted or minimum length position, the second position, which is a deployed or maximum length position, or in the third position, being an intermediate position between the first position and the second position.

6. The cabin according to claim 1, wherein at least one modular structure of the seat extensions of the plurality of units comprises a length that is different from other modular structures of the plurality of units.

7. The cabin according to claim 1, wherein the hollow volume includes an area, adjacent to the footrest area, being arranged in order to increase a length of the footrest area and/or, to form and/or integrate spaces for storing objects.

8. The cabin according to claim 1, wherein each seat that is placed in a row next to a seat extension couple forms a common structure with said seat extension couple.

* * * * *